(12) United States Patent
Shimizu

(10) Patent No.: US 8,167,451 B2
(45) Date of Patent: May 1, 2012

(54) BACKLIGHT DEVICE AND LIQUID CRYSTAL DISPLAY DEVICE

(75) Inventor: Masaki Shimizu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 570 days.

(21) Appl. No.: 12/438,510

(22) PCT Filed: Sep. 10, 2007

(86) PCT No.: PCT/JP2007/067579
§ 371 (c)(1), (2), (4) Date: Feb. 23, 2009

(87) PCT Pub. No.: WO2008/032670
PCT Pub. Date: Mar. 20, 2008

(65) Prior Publication Data
US 2010/0231828 A1   Sep. 16, 2010

(30) Foreign Application Priority Data

Sep. 13, 2006 (JP) .................................. 2006-248141
Sep. 4, 2007 (JP) .................................. 2007-228626

(51) Int. Cl.
*F21V 33/00* (2006.01)
(52) U.S. Cl. ............. 362/217.09; 362/217.08; 362/97.1; 362/219; 362/260
(58) Field of Classification Search ................. 362/97.1, 362/217.08, 217.09, 219, 221, 225, 260
See application file for complete search history.

(56) References Cited

U.S. PATENT DOCUMENTS 7,806,544 B2 * 10/2010 Kim et al. ..................... 362/97.1
2003/0198038 A1 10/2003 Choi et al.
2004/0246394 A1 12/2004 Ono et al.
2004/0257793 A1 12/2004 Wakabayashi
2005/0237009 A1 10/2005 Park
2007/0030663 A1 * 2/2007 Ryu ............................... 362/29
2008/0002392 A1 * 1/2008 Kim ............................... 362/97
2008/0007946 A1 * 1/2008 Chang ........................... 362/225

FOREIGN PATENT DOCUMENTS

CN   1451999 A   10/2003
(Continued)

*Primary Examiner* — Laura Tso
(74) *Attorney, Agent, or Firm* — Birch, Stewart, Kolasch & Birch, LLP

(57) ABSTRACT

A fluorescent tube is prevented from being wrongly attached and broken when being attached, and luminance nonuniformity of backlight due to luminance difference generated in the tube axis direction of the fluorescent tube is reduced. In a backlight device (2), a plurality of fluorescent tube sets, each of which is composed of four fluorescent tubes (21) having electrodes (211) at the both ends and a pair of lamp holders (5) storing portions close to the both electrodes at the both ends of the four fluorescent tubes (21), and the fluorescent tube sets are driven by a pair of inverter circuit board. The backlight device (2) is provided with a power transmitting member (10), which is connected to electrodes (211) at the ends on one side of the two fluorescent tubes (21), for every two adjacent fluorescent tubes configuring the fluorescent tube set, gathers wirings (9) from the electrodes (211) at the ends and transmits power; and a conduction member (7), which is connected to the electrodes (211) on the other side of the two fluorescent tubes and permits a current to flow between the electrodes at the other ends. In the lamp holder (5), the power transmitting members (10) and the conductive members (7) are alternately arranged.

9 Claims, 9 Drawing Sheets

FOREIGN PATENT DOCUMENTS

| | | |
|---|---|---|
| EP | 1840636 A2 | 10/2007 |
| JP | 2003-241694 A | 8/2003 |
| JP | 2004-39392 A | 2/2004 |
| JP | 2004-349040 A | 12/2004 |
| JP | 2005-158585 | 6/2005 |
| JP | 2005-268028 A | 9/2005 |
| JP | 2006-185742 A | 7/2006 |

* cited by examiner (A)

(B)

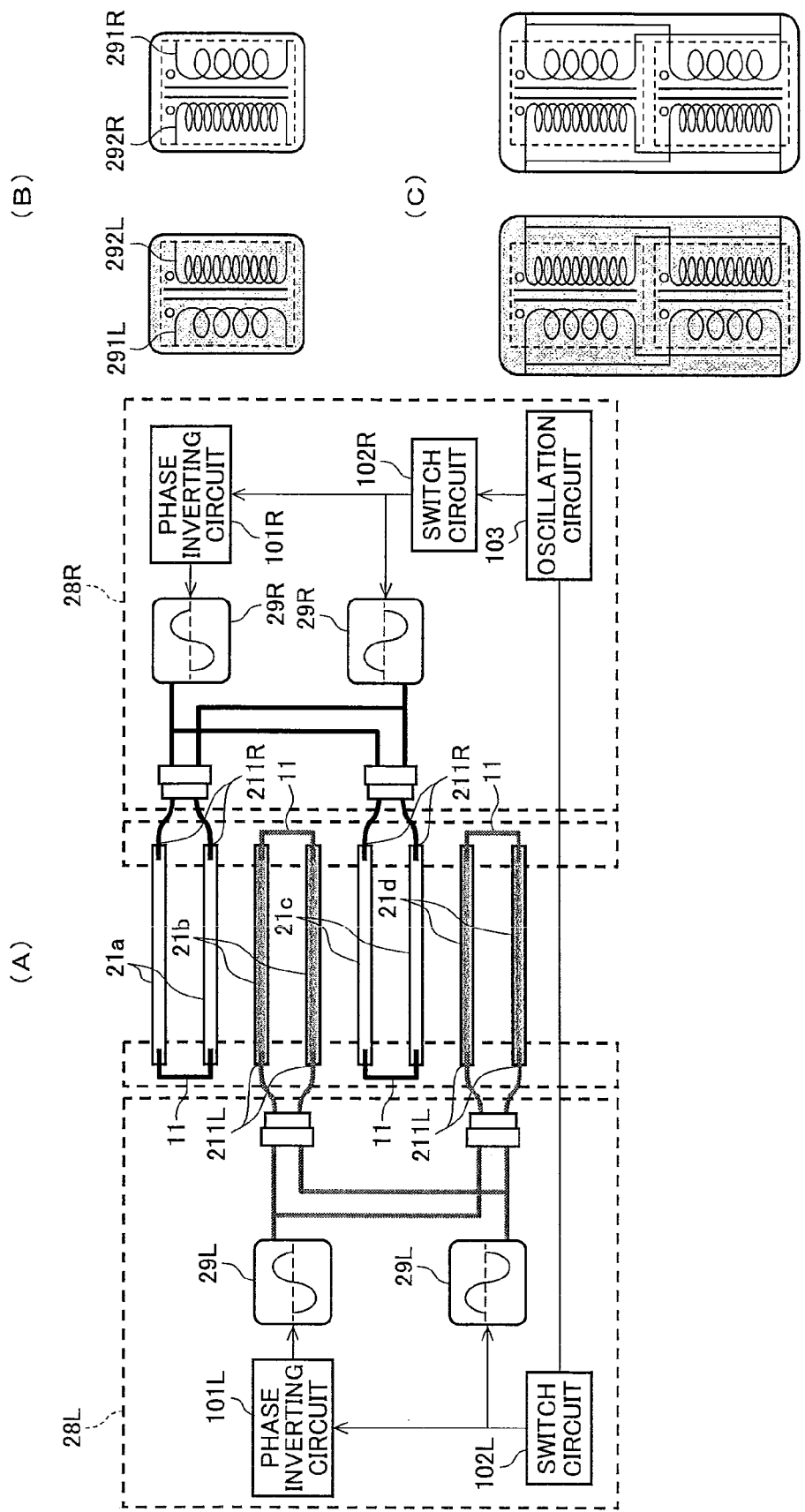

BACKLIGHT DEVICE AND LIQUID CRYSTAL DISPLAY DEVICE

TECHNICAL FIELD

The present invention relates to a backlight device having a plurality of fluorescent tubes driven by an inverter circuit and a liquid crystal display device using the backlight device.

BACKGROUND OF THE INVENTION

Recently, as liquid crystal display televisions increase in size, larger-size backlights are requested. To meet the needs of growth in size as well as energy saving and price reduction, U-shaped or square-U-shaped bent-tube fluorescent lamps are created by bending approximately center portions of long straight-tube fluorescent lamps to develop a backlight using these bent-tube fluorescent lamps as light sources instead of conventional straight-tube fluorescent lamps.

In the case of a backlight using the bent-tube fluorescent lamps, since relatively uniform temperature distribution is generated on screens less than 17-inch size, problems are less likely to occur although small differences are generated in temperature and luminance in the tube axis direction. However, as screens are further increased in size, since temperature becomes higher in lamp electrode portions that are main heat generation sources and voltages applied to the lamps are increased due to longer lengths of the lamps, leak currents tend to be generated near high voltage portions because of resultant stray capacitances between lamps and units. Because of increase in electric power for inverters due to increase in electric power for the lamps, the inverters located on the back sides of the lamp electrode portions generate more heat. As a result, temperature differences are increased in the lamp tube axis direction.

Since the leak current is generated, a lamp is lighted by a current value that is a sum of the rated current and the leak current near the high voltage portion in the tube axis direction, which causes a luminance difference in the tube axis direction. The differences in temperature and luminance tend to increase in the tube axis direction due to larger sizes of the backlights as above, resulting in backlight luminance nonuniformity.

Therefore, a backlight has been proposed to apply light with uniform luminance even in the case of large-size liquid crystal displays (see, e.g., Patent Document 1). This proposition reduces a tube wall temperature difference in a lamp tube axis direction and a surface direction and reduces a luminance difference on a surface by alternately arranging electrodes and bent portions of bent-tube fluorescent lamps and by disposing inverters immediately under respective reflection cases on the electrode feeding sides of the fluorescent lamps.
Patent Document 1: Japanese Laid-Open Patent Publication No. 2005-268028

DISCLOSURE OF THE INVENTION

Problems to be Solved by the Invention

However, in the invention described in Patent Document 1, when U-shaped lamp units are mounted on the backlight, if it is attempted to arrange the units in the correct order within a reflection case, etc., the lamps must be arranged such that the lamp electrodes of a second lamp are positioned oppositely to the lamp electrodes of a first lamp. Especially, when mounting backlight fluorescent tubes having the diameter of about 2 to 5 mm, and the length in the order of several tens of centimeters to several meters, since this operation often involves an operation of counting the number of attached lamps and an operation of changing the way of holding a lamp, it takes a lot of trouble to mount the lamp units, which may induce problems of mounting errors or damages of lamps.

At the time of attachment, the lamp electrodes must be attached to a holding portion through the soldering, etc., causing increase in operation time.

The present invention was conceived in view of the above situations and it is therefore an object of the present invention to provide a backlight device preventing mounting errors or damages of fluorescent tubes when mounting the fluorescent tubes and capable of reducing or eliminating the luminance nonuniformity of the backlight due to a luminance difference generated in the fluorescent-tube axis direction, and a liquid crystal display device using the backlight device.

Means for Solving the Problems

In order to solve the above problems, a first technical means of the present invention is a backlight device comprising a plurality of fluorescent tubes in parallel arrangement with electrodes at both ends and an electrode receiving portion that receives the fluorescent tubes in parallel arrangement nearby the electrodes, the electrode receiving portion making a pair, the electrode receiving portion including a power transfer member that holds the electrodes of the fluorescent tubes to transfer electric power to the fluorescent tubes, and a conducting member that holds the electrode of the fluorescent tube to achieve conduction between the electrode of the fluorescent tube and an electrode of other fluorescent tube, wherein by attaching the pair of the electrode receiving portion to a housing with the electrodes at the both ends of the fluorescent tubes received respectively, the fluorescent tube held by the power transfer member included in one of the electrode receiving portion is held by the conducting member included in the other electrode receiving portion.

A second technical means is the backlight device as defined in the first technical means, wherein the electrode receiving portion receives the power transfer member and the conducting member alternately in the arrangement direction of the fluorescent tubes.

A third technical means is the backlight device as defined in any one of the first or the second technical means, wherein the electrode receiving means makes a pair, and wherein by attaching the pair of the electrode receiving means to a housing with the electrodes at the both ends of the fluorescent tubes received respectively, the fluorescent tube held by the power transfer member included in one of the electrode receiving means is held by the conducting member included in the other electrode receiving means.

A fourth technical means is the backlight device as defined in any one of the first or the second technical means, wherein holding the electrodes of the two fluorescent tubes with the conductive member forms a square-U-shaped discharge path.

A fifth technical means is the backlight device as defined in any one of the first or the second technical means, wherein the electrode receiving portion is attached to a housing to overlap a first region consisting of a square-U-shaped discharge path formed by holding the electrodes of the two fluorescent tubes with the conducting member included in one of the electrode receiving portion with a second region consisting of a square-U-shaped discharge path formed by holding the electrodes of the two other fluorescent tubes with the conducting member included in the other electrode receiving portion.

A sixth technical means is the backlight device of as defined in any one of the first through the fifth technical means, wherein the power transfer member includes a plurality of holding portions, and wherein fluorescent tubes held by the holding portion at electrodes are concurrently supplied with electric power signals.

A seventh technical means is the backlight device as defined in the sixth technical means, wherein the two fluorescent tubes connected by the power transfer member are supplied with the power signals having the same frequency and phases approximately inverted to each other.

An eighth technical means is a backlight device comprising a plurality of fluorescent tubes in parallel arrangement with electrodes at both ends and an electrode receiving means that receives the fluorescent tubes in parallel arrangement nearby the electrodes at least one end, the electrode receiving means including a plurality of electrically connecting means arranged in the arrangement direction of the fluorescent tubes, the electrically connecting means holding the electrode of the fluorescent tube to serially connect the electrode of the fluorescent tube and an electrode of another fluorescent tube.

A ninth technical means is the backlight device as defined in the eighth technical means, wherein holding the electrodes of the two fluorescent tubes connected to the electrically connecting means forms a square-U-shaped discharge path.

A tenth technical means is the backlight device as defined in the eighth technical means, wherein the two fluorescent tubes connected to the electrically connecting means are supplied with the power signals having the same frequency and phases approximately inverted to each other.

An eleventh technical means is the backlight device as defined in any one of the first through the tenth technical means, wherein the fluorescent tube is made up of an external electrode fluorescent tube.

An twelfth technical means is the backlight device as defined in any one of the first through the sixth technical means, wherein the fluorescent tube includes wire electrodes of a predetermined length at both ends, and wherein the electrode receiving portion includes a holding member that pinches and holds the wire electrode of the fluorescent tube.

A thirteenth technical means is a liquid crystal display device comprising the backlight device as defined in any one of the first through the twelfth technical means, and a liquid crystal panel illuminated by the backlight device.

Effects of the Invention

The present invention may provide a backlight device preventing mounting errors or damages of fluorescent tubes when mounting the fluorescent tubes and capable of reducing or eliminating the luminance nonuniformity of the backlight due to a luminance difference generated in the fluorescent-tube axis direction, and a liquid crystal display device using the backlight device.

Since operations such as soldering is unnecessary because of a configuration with fluorescent tube wire electrodes pinched and held, the time of the fluorescent-tube mounting operation may be reduced.

BRIEF DESCRIPTION OF THE DRAWINGS

FIG. 9 is a diagram of an exemplary configuration of a backlight device according to a fourth embodiment of the present invention.

EXPLANATIONS OF REFERENCE NUMERALS

Figure 1:
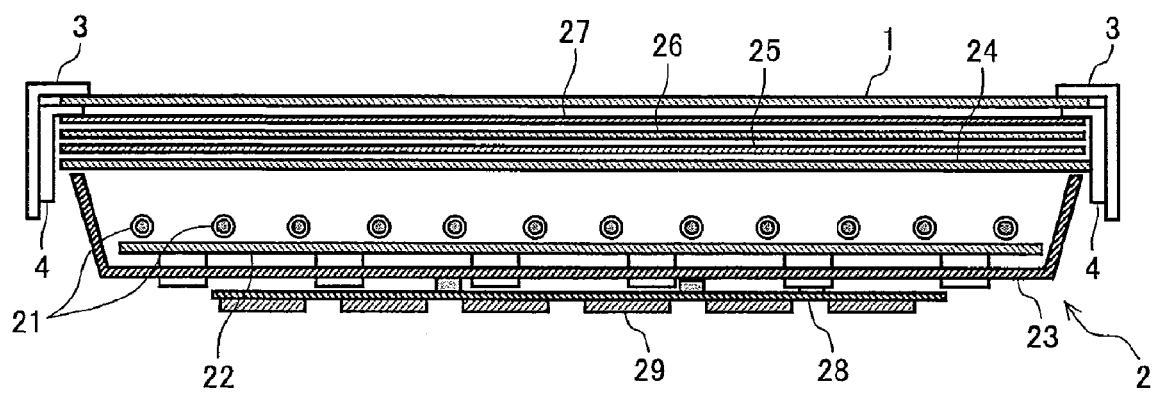
FIG. 1 is a cross-section diagram of an exemplary configuration of a liquid crystal display device using a backlight device of the present invention.

1 . . . liquid crystal panel, 2 . . . backlight device, 3, 4 . . . frame, 5 . . . lamp holder (electrode receiving portion), 6, 6' . . . holding member, 7, 7', 11 . . . conducting member, 8 . . . fixing member, 9 . . . wiring, 10 . . . power transfer member, 21 . . . fluorescent tube, 21' . . . external electrode fluorescent lamp, 22 . . . reflection sheet, 23 . . . housing; 24 . . . diffusion plate, 25 . . . diffusion sheet, 26 . . . prism sheet, 27 . . . reflective polarization plate, 28 . . . inverter circuit substrate, 29 . . . inverter transformer, 30 . . . connecting member, 101 . . . phase inversion circuit, 102 . . . switch circuit, 103 . . . oscillation circuit, and 211 . . . electrode.

PREFERRED EMBODIMENTS OF THE INVENTION

Preferred embodiments of a backlight device and a liquid crystal display device using the backlight device will now be described with reference to the accompanying drawings. Constituent elements having the same functions are given the same reference numerals and will not repeatedly be described.

FIG. 1 is a cross-section view of an exemplary configuration of a liquid crystal display device using a backlight device of the present invention. In FIG. 1, the liquid crystal display device includes a liquid crystal panel 1 and a backlight device 2 as main constituent elements. The liquid crystal panel 1 supplies a video signal subjected to a video signal process in accordance with a clock signal of the liquid crystal panel 1 for each pixel as a predetermined gradation voltage and executes a video displaying process by sequentially scan of a screen to display a video corresponding to the video signal. The backlight device 2 applies light from the opposite side of the display surface of the liquid crystal panel 1. The light sources of the backlight device 2 may be fluorescent tubes such as cold cathode fluorescent lamps (CCFL), for example.

The backlight device 2 is made up of a plurality of fluorescent tubes 21 for supplying light to the liquid crystal panel 1, a reflection sheet or reflection plate (hereinafter, represented by the reflection sheet) 22 for effectively applying the light emitted by the fluorescent tubes 21 to the liquid crystal panel 1, and a housing 23 for containing these constituent elements. The back surface of the housing 23 (i.e., the surface opposite to the surface disposed with the fluorescent tubes 21) is disposed with an inverter circuit substrate 28 (inverter circuit 28)

for mounting an inverter circuit. The inverter circuit 28 is provided with a component such as an inverter transformer 29 as a boosting circuit that supplies electric power to the fluorescent tubes 21. The inverter transformer 29 may be a wound transformer that transforms voltage in accordance with the electromagnetic induction effect of two coils based on the ratio of numbers of turns of the coils, for example.

The inverter circuit 28 may be a separately-excited inverter, for example. The separately-excited inverter is generally disposed with an oscillation circuit on the primary side to perform conversion into an alternate current of the same frequency as the drive frequency of the oscillation circuit and when the separately-excited inverter is utilized to drive the above wound inverter transformer 29, a small inverter may be implemented as a wound inverter having efficiency higher than piezoelectric-type inverters.

The liquid crystal panel 1 is made up of two glass substrates with polarization plates in the crossed-Nicols relationship having a liquid crystal layer therebetween, and the liquid crystal panel 1 is fixed and held by two frames 3 and 4 along the thickness. The frames 3 and 4 have a configuration with a cross-section bent in a substantially L-shape such that the backlight device 2 is entirely covered.

The fluorescent tubes 21 making up the backlight device 2 have a linear shape and are disposed such that the linear portions thereof are located parallel with each other. The shape of the reflection sheet 22 may be flat as shown in FIG. 1 or may be a shape with an uneven cross-section.

Various optical members may further be provided depending on optical performance necessary for the liquid crystal display device. For example, as shown in FIG. 1, the light source made up of a plurality of the fluorescent tubes 21 is provided with a diffusion plate 24 for alleviating a luminance difference between the positions disposed with the fluorescent tubes 21 and other positions, a diffusion sheet 25 for supplying optimum light distribution characteristics for a required usage pattern, a prism sheet 26 for concentrating light of a certain direction, a reflective polarization plate 27 for selectively transmitting/reflecting the polarized wave of the light of a certain direction to improve the polarization level of the light made incident on the liquid crystal panel 1, etc. These various optical members (such as the diffusion plate 24, the diffusion sheet 25, the prism sheet 26, and the reflective polarization plate 27) are formed in a plate shape or a sheet shape and are disposed between the fluorescent tubes 21 and the liquid crystal panel 1.

The fluorescent tubes 21 excite mercury within the fluorescent tubes 21 with a high alternating voltage supplied to electrodes from the inverter transformers 29 of the inverter circuits 28 disposed in parallel on the back surface of the backlight device 2 to emit light near ultraviolet with the energy level thereof, and the ultraviolet light causes three-colored fluorescent materials of red, blue, and green of the fluorescent tubes 21 to emit lights, which are mixed to supply white light. The white light emitted in this way is controlled in the light distribution characteristics by the above various optical members and the light may effectively be supplied to the liquid crystal panel 1. The supply of light from the backlight device 2 controls brightness of pixels through the light transmission rates corresponding to the gradation voltages at the pixels of the liquid crystal panel 1 to display a video on the screen.

Figure 2:
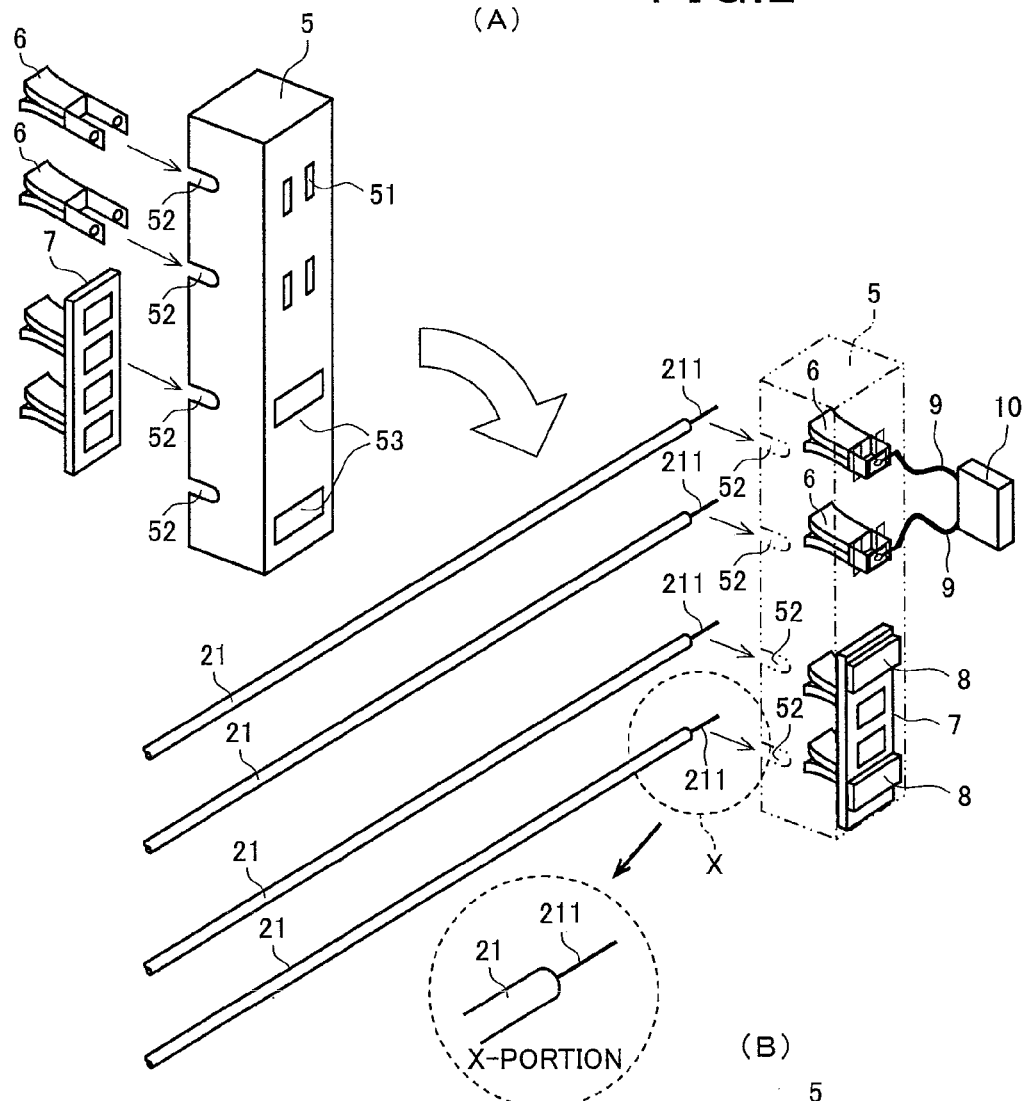
FIG. 2 is a diagram of an exemplary configuration in the vicinity of electrode portions of the backlight device according to the present invention.
Figure 2:
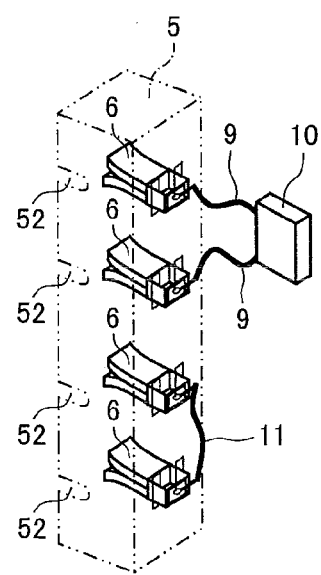

FIG. 2 is a diagram of an exemplary configuration in the vicinity of electrode portions of the backlight device 2 according to the present invention. In FIG. 2(A), a reference numeral 5 denotes a lamp holder corresponding to an electrode receiving portion of the present invention that receives the four fluorescent tubes 21 nearby electrodes at both ends; 6 denotes holding members for holding electrodes 211 (see X-portion) of the two adjacent fluorescent tubes 21 (in the order from the top); 7 denotes a conducting member that holds the electrodes 211 of the other two adjacent fluorescent tubes 21 to achieve conduction between the electrodes; 8 denotes a fixing member that fixes the conducting member 7 to the lamp holder 5; 9 denotes wirings connected to the holding members 6; 10 denotes a power transfer member that bundles the wirings 9 to transfer electric power. A member made up of the holding members 6, the wirings 9, and the power transfer member 10 is collectively referred to as the power transfer member 10.

As shown in X-portion of FIG. 2(A), the fluorescent tube of the embodiment includes wire electrodes 211 of a predetermined length at both ends. The holding member 6 is configured to pinch and hold the wire electrode 211 of the fluorescent tube 21.

The backlight device 2 includes an arrangement of a plurality of fluorescent tubes made up of the four fluorescent tubes 21 having the electrodes 211 at both ends and the two lamp holders 5 receiving the four fluorescent tubes 21 nearby the electrodes at both ends. The lamp holders 5 receiving a plurality of the fluorescent tubes includes mounting holes 51 for mounting and fixing the holding members 6 onto the lamp holder 5, notch portions 52 for receiving the four fluorescent tubes 21 nearby the electrode portions, and mounting holes 53 for mounting and fixing the conducting member 7 onto the lamp holder 5.

The holding member 6 is made up of a pinching portion that pinches and fixes the electrode 211 of the fluorescent tube 21 and inserting portions inserted into the mounting holes 51, and the inserting portions are inserted into the mounting holes 51 and the inserting portions are bent toward each other and connected to the wiring 9 by soldering, etc., as shown in FIG. 2(A). As a result, the electrode 211 of the fluorescent lamp 21 is electrically connected to the wiring 9.

Figure 6:
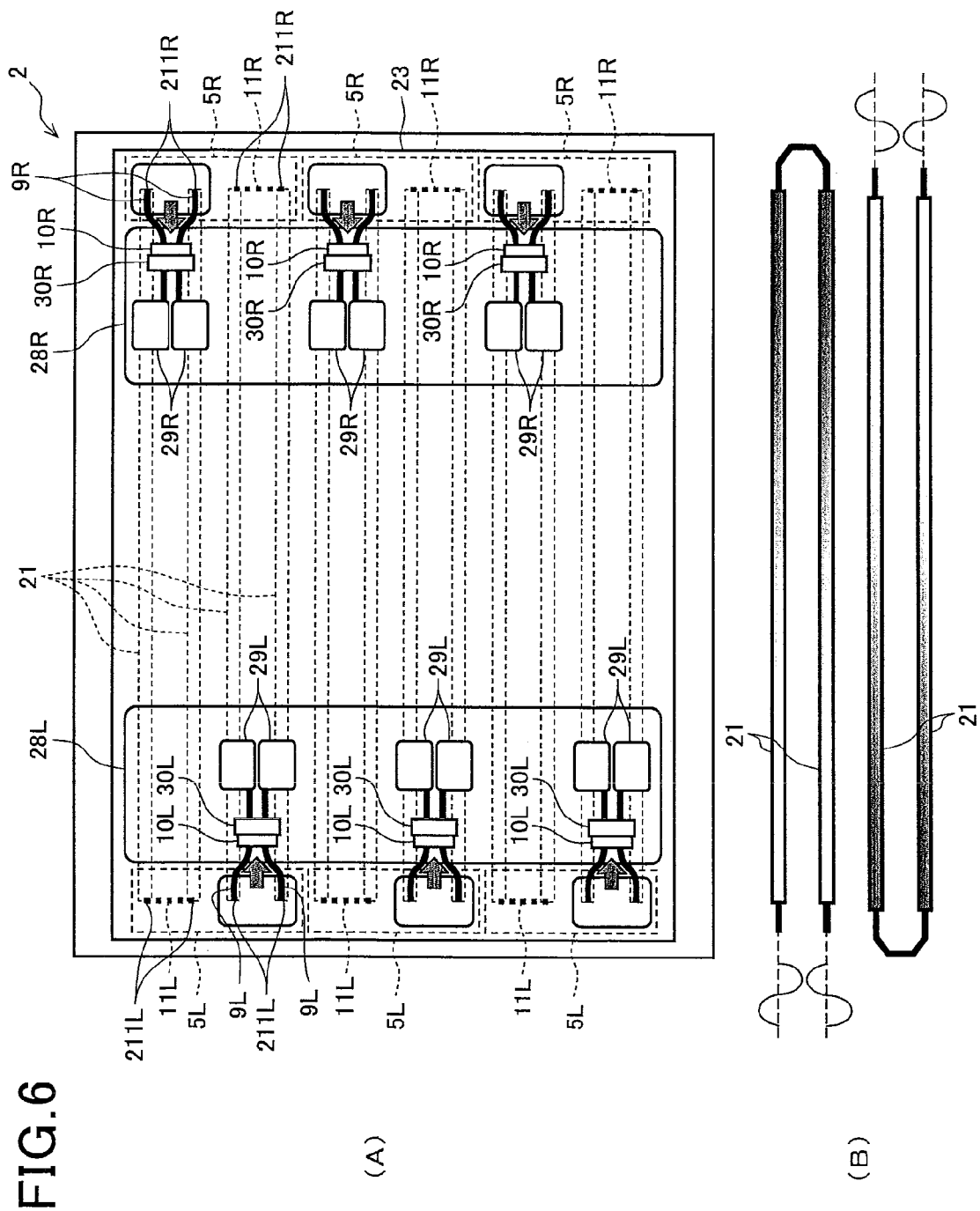
FIG. 6 is a diagram of an exemplary configuration of a backlight device according to a second embodiment of the present invention.
Figure 7:
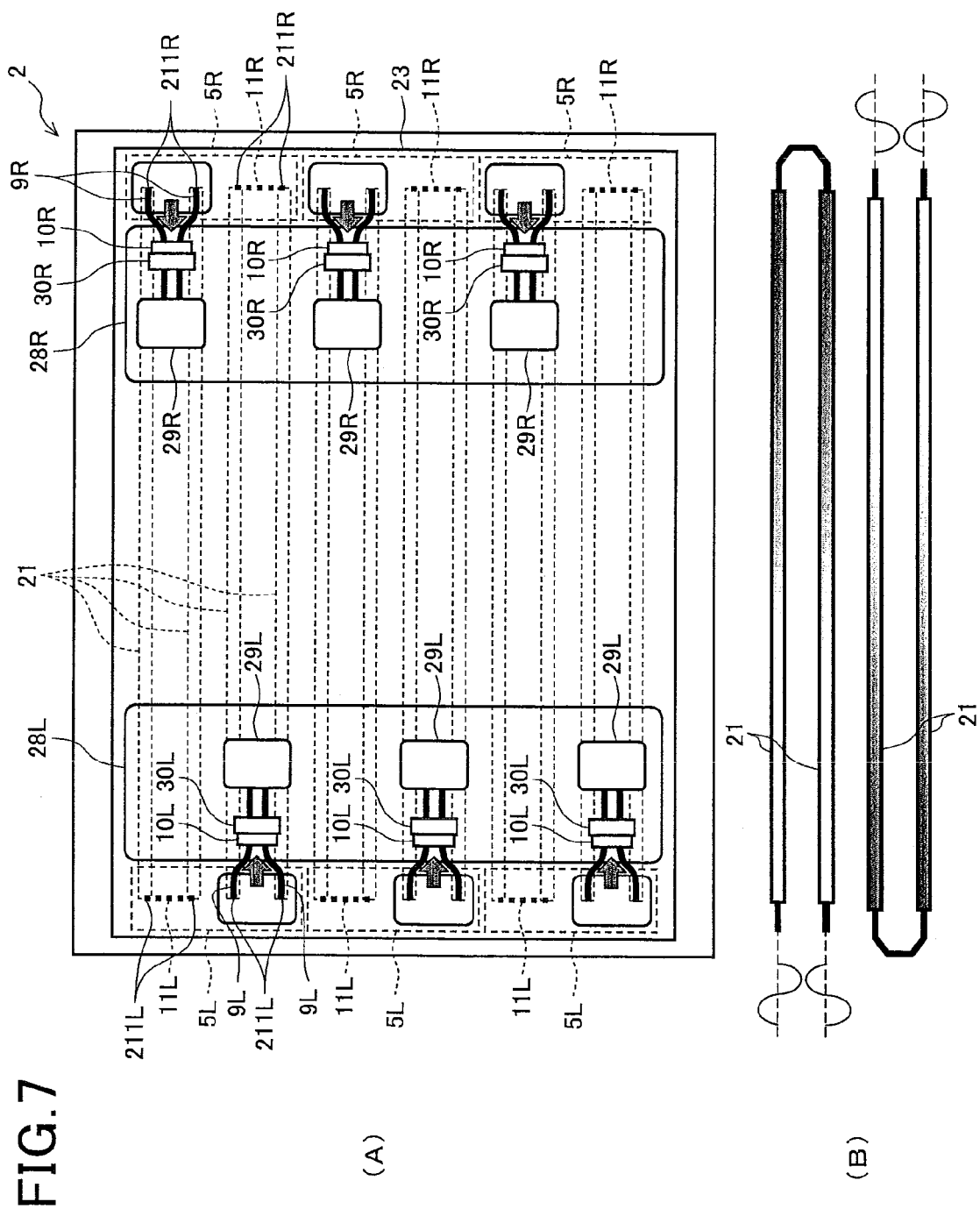
FIG. 7 is a diagram of an exemplary configuration of a backlight device according to a third embodiment of the present invention.

A plurality of the holding members 6 included in the power transfer member 10 may be configured such that power signals are concurrently supplied to the fluorescent tubes 21 held by the holding members 6 at the electrodes 211. In this case, the fluorescent tubes in the lamp holder are driven on both sides by the inverter transformers 29 at every two tubes as shown in FIGS. 6 and 7 described later. In this situation, the power transfer members 10 may be supplied with the power signals having the same frequency and phases inverted to each other.

The conducting member 7 consists of two holding portions pinching and fixing the electrodes 211 of the fluorescent tubes 21 and a supporting portion that conductively support the two holding portions, and the supporting portion is fixed by the fixing members 8 through the mounting holes 53 from the outside of the lamp holder 5. As a result, the electrodes 211 of the fluorescent tubes 21 are made conductive with each other through the conducting member 7.

In FIG. 2(A), the lamp holders 5 on both ends are disposed with the power transfer members 10 and the conducting members 7 alternately one-by-one for every two fluorescent holders. For example, the lamp holder 5 on one end is disposed with the power transfer member 10 and the conducting member 7 from the top, and the lamp holder 5 on the other end is disposed with the conducting member 7 and the power transfer member 10 in this order. The power transfer member 10 is connected to the inverter transformer 29 through a connecting member described later and a high alternating voltage is supplied from the inverter transformer 29 to at least one of the electrodes 211.

The vicinity of the electrode portions of the four fluorescent tubes 21 are set into the notch portions 52, and the electrodes 211 may electrically be connected through the power transfer member 10 to the inverter transformer 29 by pinching and fixing the electrodes 211 of the two adjacent fluorescent tubes 21 in the order from the top with the holding members 6. The electrodes 211 of the two other adjacent fluorescent tubes 21 are pinched and fixed by the conducting member 7 to make the electrodes 211 electrically conductive with each other. As a result, the electrodes 211 of the two fluorescent tubes 21 are held by the conducting member 7 and a square-U-shaped discharge path is formed.

Because of the pinching fixation, the fluorescent tubes 21 may be fixed to the holding members 6 in an extremely short time and this is advantageous in terms of the mounting operation time as compared to the soldering fixing method, etc. At the time of the lamp replacing operation, the fluorescent tubes 21 may extremely easily be detached from the holding members 6, which is advantageous in terms of the operation time and the operation quality.

The lamp holders (electrode receiving portions) 5 are configured as a pair to receive the respective electrodes 211 on the both ends of the fluorescent tubes 21 arranged in parallel, and the pair of the lamp holders 5 receives pairs of the respective electrodes 211 of the fluorescent tubes 21 and is attached to the housing. Therefore, the fluorescent tubes 21 held by the power transfer member 10 of one of the lamp holders 5 are held by the conducting member 7 of the other lamp holder 5.

By only arranging the straight-tube fluorescent tubes 21 in the lamp holders 5 in this way, the same effect may be acquired as alternately disposing the electrode sides and the bent sides of the conventional bent-tube fluorescent lamps. Since the high-voltage sides (closer to the power transfer members 10) and the low-voltage sides (closer to the conducting members 7) of fluorescent tube are alternately disposed in the lamp holders, the luminance difference in the tube axis direction may be reduced and the backlight luminance nonuniformity may be reduced or eliminated.

As shown in FIG. 2(B), a conducting member 11 may be used to achieve conduction between the electrodes 211 of the fluorescent tubes 21 by connecting the two holding members 6 to each other instead of the conducting member 7 shown in FIG. 2(A). The conducting member 11 connecting the two holding members 6 may achieve conduction between the electrodes 211 pinched and fixed by the holding members 6 as is the case with the conducting member 7 shown in FIG. 2(A). A member made up of the holding members 6 and the conducting member 11 is collectively referred to as the conducting member 11.

A first region consisting of a square-U-shaped discharge path formed by holding the electrodes of the two fluorescent tubes 21 with the conducting member 11 included in the one lamp holder 5 of the pair of the lamp holder 5 may be mounted to the housing in an overlapping manner with a second region consisting of a square-U-shaped discharge path formed by holding the electrodes of the two other fluorescent tubes 21 with the conducting member 11 included in the other lamp holder 5. Assuming that the four fluorescent tubes 21 arranged in the lamp holders 5 at both ends in FIG. 2(A) are fluorescent tubes $21_1$, $21_2$, $21_3$, and $21_4$ from the top, the first region is a region including the square-U-shaped discharge path formed by holding the electrodes of the fluorescent tubes $21_1$ and $21_3$ with the conducting member 11, and the second region is a region including the square-U-shaped discharge path formed by holding the electrodes of the fluorescent tubes $21_2$ and $21_4$ with the conducting member 11. When such a configuration is achieved, since the first region and the second region overlap each other and the high-voltage sides and the low-voltage sides of the fluorescent tubes are alternately disposed for each fluorescent tube, an ability to eliminate the backlight luminance nonuniformity may further be enhanced in the direction perpendicular to the tube axis direction (i.e., the arrangement direction of the fluorescent tubes).

An external electrode fluorescent lamp (EEFL) having external electrodes formed on an electrodeless glass tube has been proposed to achieve a backlight device capable of ensuring high luminance and high efficiency of liquid crystal display devices and achieving a longer operating life and a lighter weight in association with the increase in size of liquid crystal panels in recent years. The EEFL may be applied to the fluorescent tubes 21 of the present invention.

In view of the object of the conducting member 7 or 11, the above wiring configuration may be any configuration creating a state of "electrically connecting" the fluorescent tubes, and this conducting member is also referred to as an electrically connecting portion in some cases. Therefore, the complete conduction may not necessarily be achieved between the electrodes to be connected only by the wirings, and the both electrodes are electrically connected through ballast components such as condensers, coils, and transformers. Therefore, this may be utilized for the mounting design for components to be mounted for other objects. For example, this configuration is also suitable for the purpose of mounting circuits for detecting damages of fluorescent tubes or detecting a current value.

A plurality of the conducting members 7, 11, i.e., the electrically connecting portion is included and arranged in the arrangement direction of the fluorescent tubes on the lamp holder 5 and holds an electrode of a fluorescent tube to serially connect the electrode of the fluorescent tube and an electrode of another fluorescent tube. With such a configuration, a particular effect may be achieved that the troublesome work of including the number of parts of the substrate more than necessary may be avoided when a plurality of wirings acting as the electrically connecting portion is necessary on one end side or the other end side of the fluorescent tubes.

Figure 3:
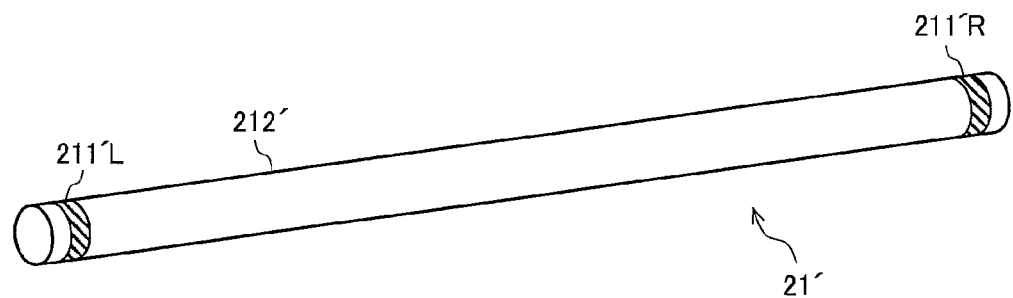
FIG. 3 is an external view of an example of an external electrode fluorescent lamp that is another embodiment of the fluorescent tube.
Figure 3:
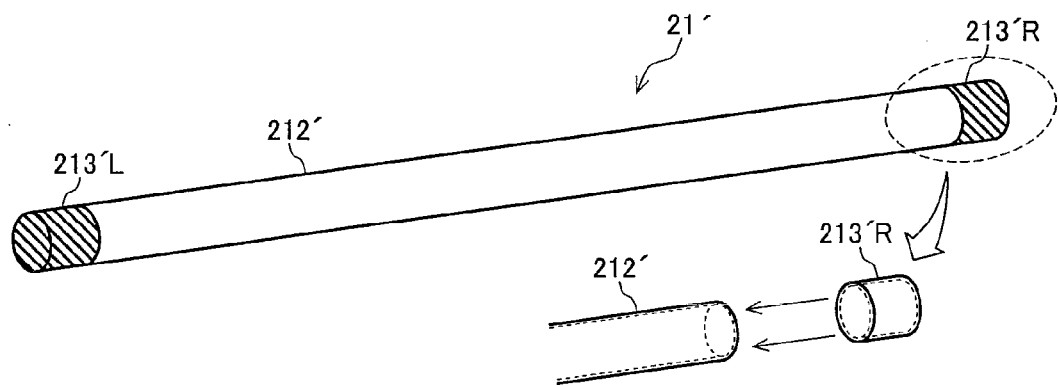

FIG. 3 is an external view of an example of an external electrode fluorescent lamp that is another embodiment of the fluorescent tube 21 and, in FIG. 3, a reference numeral 21' denotes an external electrode fluorescent lamp. In FIG. 3(A), the external electrode fluorescent lamp 21' is a belt-shaped external electrode fluorescent lamp and a glass tube 212' is provided with electrodes 211'R and 211'L at both ends. The electrodes 211'R and 211'L at both ends are driven with a high frequency of several MHz or more.

In FIG. 3(B), the external electrode fluorescent lamp 21' is a capsule-shaped external electrode fluorescent lamp and the glass tube 212' is provided with metal capsules 213'R and 213'L as electrodes at both ends. The metal-capsule-shaped external electrode fluorescent lamp 21' as above is used particularly when the diameter of the glass tube 212' is large.

Figure 4:
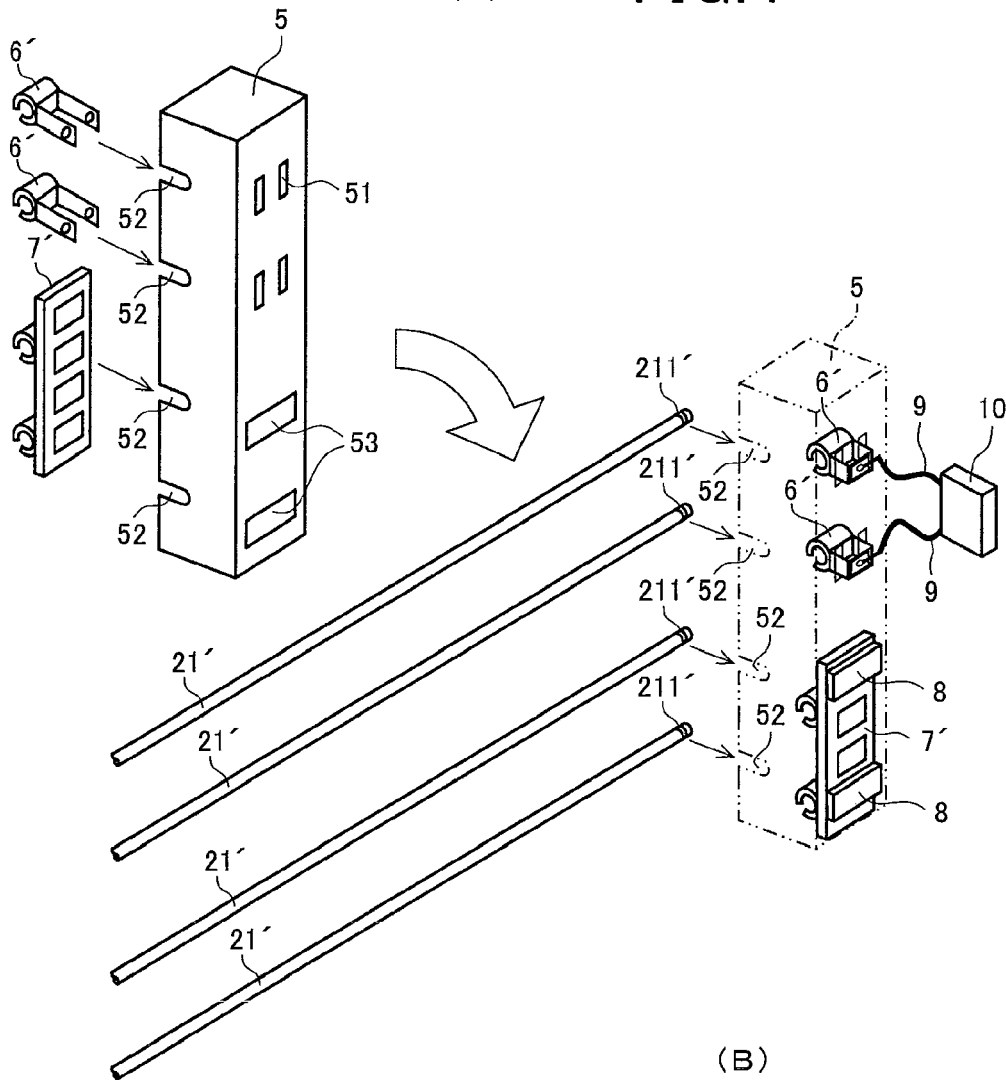
FIG. 4 is a diagram of another exemplary configuration in the vicinity of the electrode portions of the backlight device according to the present invention.
Figure 4:
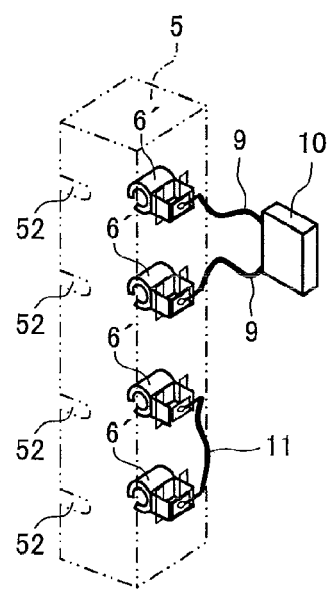

FIG. 4 is a diagram of another exemplary configuration in the vicinity of the electrode portions of the backlight device 2 according to the present invention. This example illustrates a configuration in the vicinity of the electrode portions when the external electrode fluorescent lamps 21' are used. In FIGS. 4(A) and 4(B), the lamp holder 5 includes a holding member 6' and a conducting member 7' and the shape of these members is different from the shape of the holding member 6 and the conducting member 7 (holding portion) shown in FIG. 2. Although the shape of the holding member 6 and the conducting member 7 shown in FIG. 2 is a clip shape for pinching and fixing the electrode 211 of the fluorescent tube 21, the shape of the holding member 6' and the conducting member 7 shown in this example corresponds to the external electrode 211' of the fluorescent tube 21' and is a ring shape for engaging with the external electrode 211'. Other constituent members, i.e., the fixing members 8, the wiring 9, the power transfer member 10, and the conducting member 11 are the same as those shown in FIG. 2 and will not be described here.

By alternately disposing the conducting members for achieving the electric connection (conduction) between the electrodes of the fluorescent tubes and the power transfer members for supplying the high alternating voltage from the inverter transformers to the electrodes of the fluorescent tubes in the lamp holders, the same effect may be acquired as alternately disposing the electrode sides and the bent sides of the conventional bent-tube fluorescent lamps by simply inserting the straight-tube fluorescent lamps. Since the high-voltage sides and the low-voltage sides of fluorescent tubes are alternately disposed in the lamp holders, the luminance difference in the tube axis direction may be reduced and the backlight luminance nonuniformity may be reduced or eliminated.

When four fluorescent tubes are disposed in the lamp holders on both ends, since no consideration is required for the positions of the electrodes as in the case of the bent-tube fluorescent lamps in a U-shape, etc., the operation of changing the way of holding a lamp, etc., are not generated and the disposition work becomes easier. When a plurality of the disposed fluorescent tubes is connected to the inverter circuit substrate, the power transfer member for the fluorescent tubes may simply be attached to a connecting member of the inverter circuit substrate. Therefore, production personnel, etc., may prevent mounting errors or damages of lamps and may easily and certainly perform the attachment work when arranging the fluorescent tubes.

Embodiments will be described for the backlight device preventing mounting errors or damages of fluorescent tubes when mounting the fluorescent tubes and capable of reducing or eliminating the luminance nonuniformity of the backlight due to a luminance difference generated in the fluorescent-tube axis direction by arranging the lamp holders receiving a plurality of fluorescent tubes as shown in FIG. 2 or 4 at a plurality of positions.

First Embodiment

Figure 5:
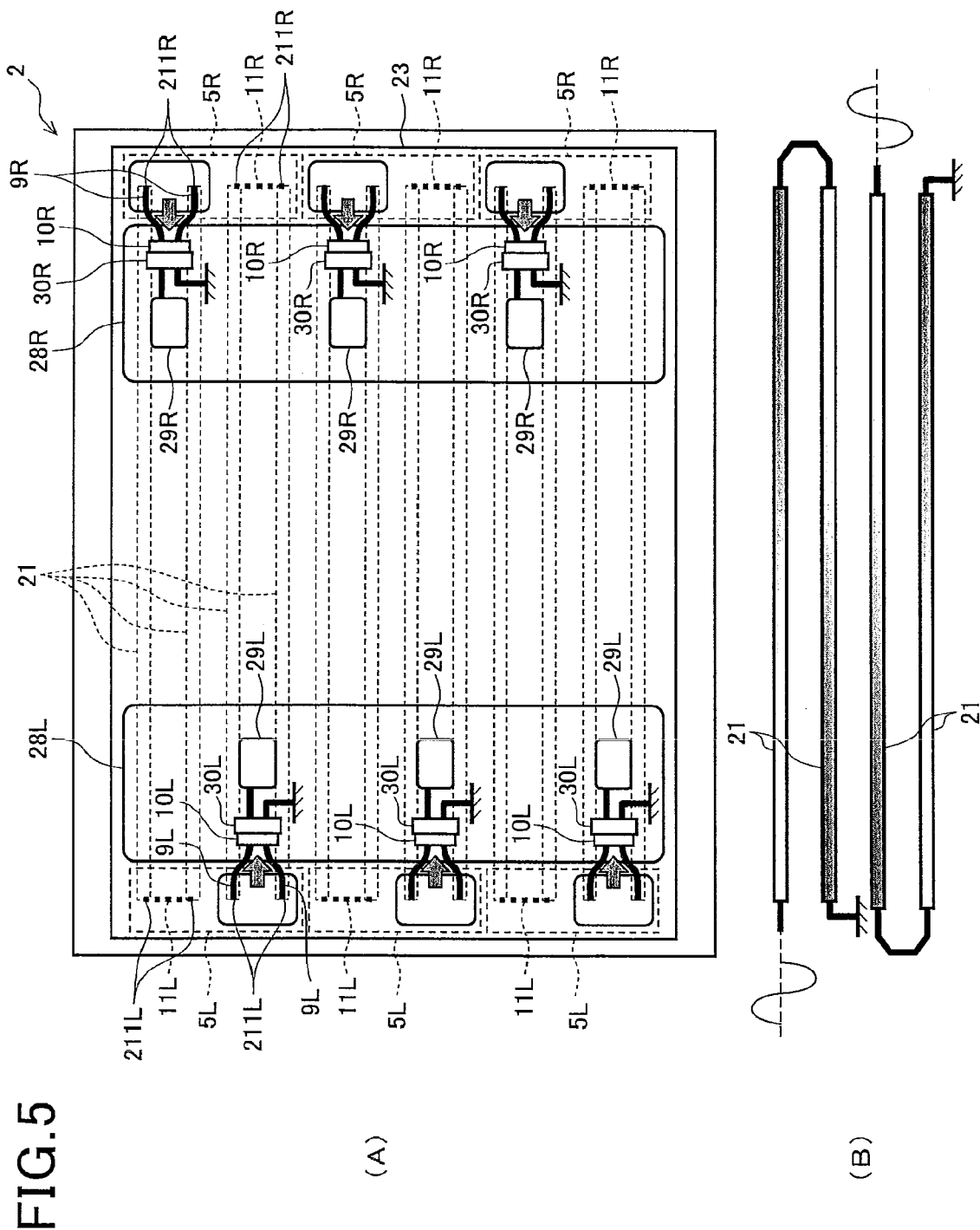
FIG. 5 is a diagram of an exemplary configuration of a backlight device according to a first embodiment of the present invention.

FIG. 5 is a diagram of an exemplary configuration of the backlight device 2 according to a first embodiment of the present invention. In FIG. 5(A), 5R denotes one lamp holder; 211R denotes four electrodes on one side of the four fluorescent tubes 21; 9R denotes wirings from the two adjacent electrodes 211R; 10R denotes a power transfer member that bundles the wirings 9R to transfer electric power; and 11R denotes a conducting member that achieves conduction between the two other adjacent electrodes 211R; and similarly, 5L denotes the other lamp holder; 211L denotes four electrodes on the other side of the four fluorescent tubes 21; 11L denotes a conducting member that achieves conduction between the two adjacent electrodes 211L; 9L denotes wirings from the two other adjacent electrodes 211L; and 10L denotes a power transfer member that bundles the wirings 9L to transfer electric power.

The holding member 6 in the lamp holder will not be described. The lamp holders 5R and 5L, the electrodes 211R and 211L, the wirings 9R and 9L, the power transfer members 10R and 10L, and the conducting members 11R and 11L are made up of the same respective members and are often represented by the lamp holder 5, the electrode 211, the wiring 9, the power transfer member 10, and the conducting member 11, respectively.

The backlight device 2 includes an arrangement of a plurality of fluorescent tube sets made up of the four fluorescent tubes 21 having the electrodes 211 at both ends and a pair of the lamp holders 5 receiving the four fluorescent tubes 21 nearby the electrodes at both ends. The backlight device 2 also includes a pair of inverter circuit substrates 28R, 28L for lighting a plurality of fluorescent tube sets, and connecting members 30R, 30L connected to the power transfer members 10R, 10L and supplying the high alternating voltages from inverter transformers 29R, 29L on the inverter circuit substrates 28R, 28L to one electrode of the electrodes 211R, 211L of two fluorescent tubes connected to the power transfer members 10R, 10L, and the lamp holder 5 is alternately disposed with the power transfer member 10 and the conducting member 11.

The inverter circuit substrates 28R and 28L, the inverter transformers 29R and 29L, and the connecting members 30R and 30L are made up of the same respective members and are often represented by the inverter circuit substrate 28, the inverter transformer 29, and the connecting member 30, respectively.

In FIG. 5(A), a fluorescent tube set is made up of the four fluorescent tubes 21 and a pair of the lamp holders 5, and three fluorescent tube sets (12 fluorescent tubes 21) are arranged side-by-side. The inverter circuit substrates 28R and 28L making up a pair of the inverter circuit substrates are provided on the surface opposite to the disposition surface of a plurality of the fluorescent sets and are located near the electrodes at both ends of the fluorescent tube sets. The inverter circuit substrates 28R and 28L are disposed with the connecting members 30R and 30L correspondingly to the power transfer members 10R and 10L.

The one inverter circuit substrate 28R is disposed with the connecting members 30R defined as the high-voltage side of the fluorescent tube sets and the lamp holder 5R is alternately disposed with the power transfer members 10R connected to the connecting members 30R and the conducting members 11R defined as the low-voltage side from the top. Similarly, the other inverter circuit substrate 28L is disposed with the connecting members 30L defined as the high-voltage side of the fluorescent tube sets and the lamp holder 5L is alternately disposed with the conducting members 11L defined as the low-voltage side and the power transfer members 10L connected to the connecting members 30L from the top. The inverter transformer 29 is connected on the high-voltage side of the fluorescent tube sets, and the electrodes of the fluorescent tubes 21 are made conductive with each other on the low-voltage side.

In this embodiment, the high alternating voltage from the inverter transformer 29 is supplied to one electrode of the two electrodes 211 on the high-voltage side (the side connected to the inverter transformer 29) for every two fluorescent tubes in the lamp holders 5 and the other electrode is grounded. Therefore, every two fluorescent tubes in the lamp holders 5 are driven on one side by the one inverter transformer 29.

The connecting members 30R and 30L are detachably connected to the power transfer members 10R and 10L, respectively. The connecting member 30 and the power transfer member 10 are, for example, a socket (the reception side) and a plug (the insertion side), respectively, and when the socket and the plug are connected, one electrode is electrically connected to the inverter transformer 29 for every two fluorescent tubes. The socket and the plug may be inverted of course. In this case, the connecting member 30 is a plug and the bundling member 213 is a socket.

When such a configuration is achieved, the same effect may be acquired as alternately disposing the electrode sides and the bent sides of the conventional bent-tube fluorescent lamps. Since the high-voltage side and the low-voltage side are alternately disposed for every two fluorescent tubes in the lamp holders as shown in FIG. 5(B), the luminance difference in the tube axis direction may be reduced and the backlight luminance nonuniformity may be reduced or eliminated.

When the four fluorescent tubes 21 are disposed in a pair of the lamp holders 5, since no consideration is required for the positions of the electrodes as in the case of the bent-tube fluorescent lamps in a U-shape, etc., the operation of changing the way of holding a lamp, etc., are not generated and the disposition work becomes easier. When the disposed fluorescent tube set is connected to the inverter circuit substrate 28, the power transfer member 10 for the fluorescent tube set may simply be attached to the connecting member 30 of the inverter circuit substrate. Therefore, production personnel, etc., may prevent mounting errors or damages of lamps and may easily and certainly perform the attachment work when arranging the fluorescent tubes.

Since the bending configuration is employed in the case of the conventional bent-tube fluorescent lamps, the total length in the longitudinal direction is about a half of the length of the same straight-tube fluorescent lamps, which constrains the enlargement of the size of screen. On the other hand, the backlight device 2 according to the present invention may support larger-size screens since the straight-tube fluorescent lamps are used.

Second Embodiment

FIG. 6 is a diagram of an exemplary configuration of the backlight device 2 according to a second embodiment of the present invention. In FIG. 6(A), the backlight device 2 has the same configuration as the first embodiment except that the inverter transformer 29 and the connecting member 30 have different configurations. The connecting member 30 of this embodiment is connected to the power transfer member 10 and supplies the high alternating voltage from the inverter transformer 29 on the inverter circuit substrate 28 to both of the electrodes 211 of the two fluorescent tubes 21 connected to the power transfer member 10. The one inverter transformer 29 may be disposed for each of the both electrodes 211 to supply the high alternating voltage to the both electrodes 211. Therefore, every two fluorescent tubes in the lamp holders 5 are driven on both sides by the two inverter transformers 29.

When such a configuration is achieved, the same effect may be acquired as alternately disposing the electrode sides and the bent sides of the conventional bent-tube fluorescent lamps. Since the high-voltage side and the low-voltage side are alternately disposed for every two fluorescent tubes in the lamp holders as shown in FIG. 6(B), the luminance difference in the tube axis direction may be reduced and the backlight luminance nonuniformity may be reduced or eliminated.

Third Embodiment

FIG. 7 is a diagram of an exemplary configuration of the backlight device 2 according to a third embodiment of the present invention. In FIG. 7(A), the backlight device 2 has the same configuration as the first embodiment except that the inverter transformer 29 and the connecting member 30 have different configurations. The connecting member 30 of this embodiment is connected to the power transfer member 10 and supplies the high alternating voltage from the inverter transformer 29 on the inverter circuit substrate 28 to both of the electrodes 211 of the two fluorescent tubes 21 connected to the power transfer member 10. The one inverter transformer 29 may be disposed for the both electrodes 211 to supply the high alternating voltage to the both electrodes 211. Therefore, every two fluorescent tubes in the lamp holders are driven on both sides by the one inverter transformer 29.

When such a configuration is achieved, the same effect may be acquired as alternately disposing the electrode sides and the bent sides of the conventional bent-tube fluorescent lamps. Since the high-voltage side and the low-voltage side are alternately disposed for every two fluorescent tubes in the lamp holders as shown in FIG. 7(B), the luminance difference in the tube axis direction may be reduced and the backlight luminance nonuniformity may be reduced or eliminated.

Figure 8:
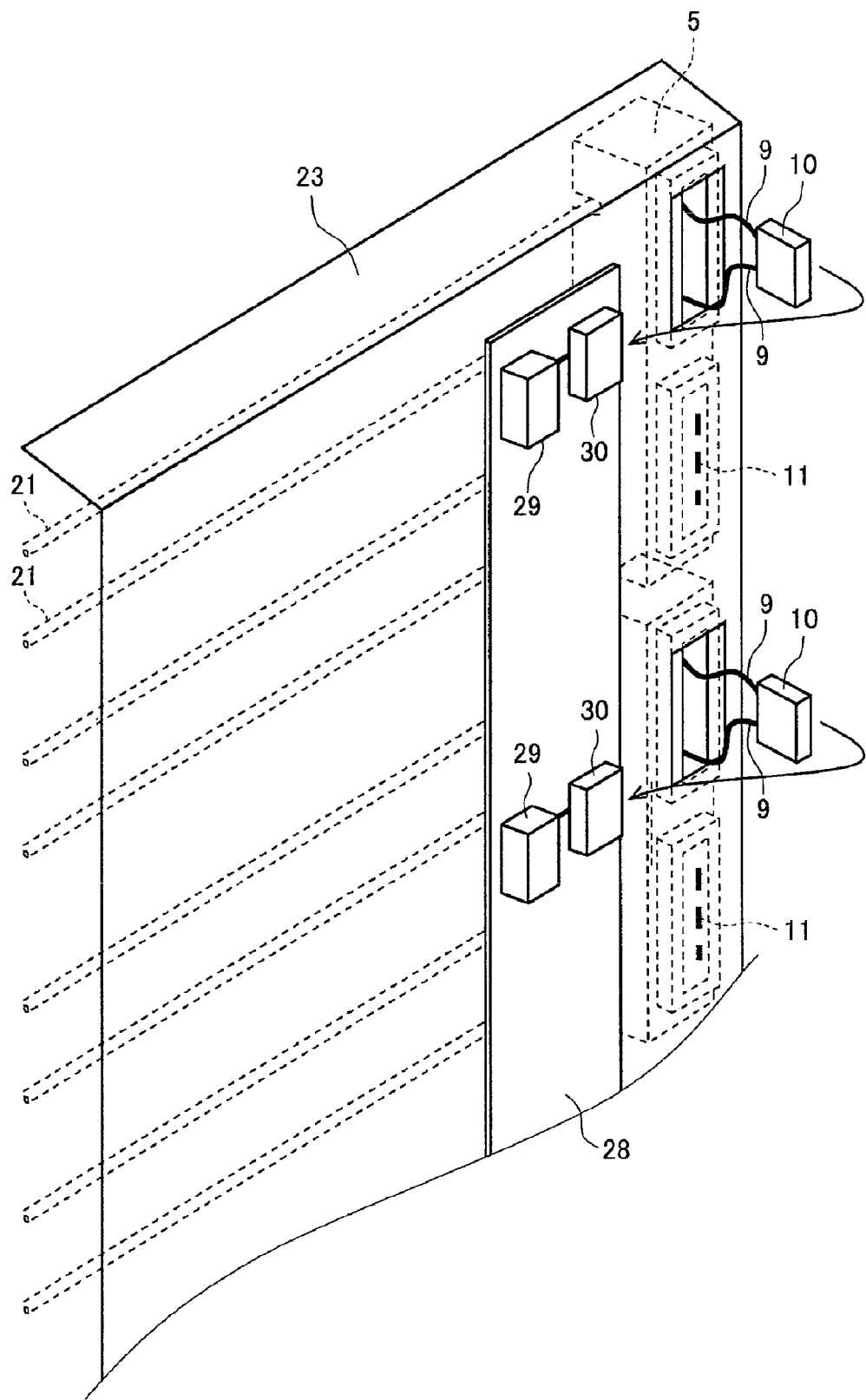
FIG. 8 is a diagram for explaining an example of an assembling method of the backlight device of the present invention.

FIG. 8 is a diagram for explaining an example of an assembling method of the backlight device 2 of the present invention. The inverter circuit substrate 28 is disposed on the external surface (i.e., the opposite surface of the disposition surface of the fluorescent tubes 21) of the housing 23 as shown. The inverter circuit substrate 28 is disposed with the connecting members 30 for supplying the high alternating voltage from the inverter transformers 29 correspondingly to the power transfer member 10. The power transfer member 10 and the connecting member 30 are connected for the two adjacent fluorescent tubes 21 on the upper side among the four fluorescent tubes received in the lamp holder and the high alternating voltage from the inverter transformers 29 is supplied to at least one of the electrodes of the two fluorescent tubes 21 through the connecting member 30. In this case, the electrodes of the other two adjacent fluorescent tubes 21 on the lower side are made conductive with each other through the conducting member 11. Therefore, since the high-voltage side and the low-voltage side are alternately disposed for every two fluorescent tubes in the lamp holders, the luminance difference in the tube axis direction may be reduced and the backlight luminance nonuniformity may be reduced or eliminated.

According to the present invention, since the high-voltage side and the low-voltage side are alternately disposed in the fluorescent tube set made up of four fluorescent tubes and a pair of the lamp holders, the luminance difference in the tube axis direction may be reduced and the backlight luminance nonuniformity may be reduced or eliminated in the same way as alternately disposing the electrode sides and the bent sides of the conventional bent-tube fluorescent lamps.

When four fluorescent tubes are disposed in a pair of the lamp holders, since no consideration is required for the positions of the electrodes as in the case of the bent-tube fluorescent lamps in a U-shape, etc., the operation of changing the way of holding a lamp, etc., are not generated and the disposition work becomes easier. When a plurality of the disposed fluorescent tubes is connected to the inverter circuit substrate, the power transfer member for the fluorescent tubes may simply be attached to the connecting member of the inverter circuit substrate. Therefore, production personnel, etc., may prevent mounting errors or damages of lamps and may easily and certainly perform the attachment work when arranging the fluorescent tubes.

Fourth Embodiment

In the embodiments of the present invention described above, as shown in FIG. 9, a fluorescent tube unit 21a having two serially connected fluorescent tubes as one unit may be driven in a configuration with another fluorescent tube unit (21c) connected in parallel for the inverter transformer. This enables the number of components to be reduced as much as possible within the range of electric power available from the output of the inverter transformer.

Specifically, connections are made as follows.

As shown in FIG. 9(A), the one inverter circuit substrate 28R includes the two inverter transformers 29R. A switch circuit 102R (e.g., made up of two or four transistors such as FETs) performs the push-pull drive with an oscillation signal output from an oscillation circuit 103. This switch circuit 102R continuously changes the directions of the currents applied to the primary winding wires of the respective transformers in accordance with the oscillation frequency. The electric power input to the transformer is converted into an output voltage obtained by multiplying the input voltage by a step-up ratio N corresponding to a ratio of the numbers of turns of the primary winding wire and the secondary winding wire included in the transformer to apply a high alternating voltage to the extent that the discharge phenomenon occurs in the fluorescent tubes.

A phase inverting circuit 101R is also included to maintain the opposite phase relationship in the alternating voltages output from the two inverter transformers 29R. Specifically, although the transformers may be configured with a relationship that the second winding wires are wound in the opposite directions to the primary winding wires wound around bobbins of the respective transformers in some examples, this is not particularly a limitation, and the high voltage terminals may be connected to the fluorescent tubes such that the GND terminals and the high-voltage terminals of the respective secondary wires of the transformers having the same configuration are reversed from each other.

The high alternating voltages with opposite phases output from the two inverter transformers 29R are supplied to the two respective electrodes 211R on the other end of the unit of the two fluorescent tubes 21a serially connected through the conducting member 11, and the fluorescent tubes connected into the U-shape are driven in this configuration. The two high alternating voltages are also input to another unit of the two fluorescent tubes 21c at the same time and, therefore, the two fluorescent tube units 21a and 21c each made up of two serially connected fluorescent tubes are connected and driven in parallel for the inverter transformers 29R.

Similarly, the fluorescent tube units 21b and 21d each made up of two serially connected fluorescent tubes are connected and driven in parallel with the same configuration as the fluorescent tube units 21a and 21c above including the two inverter transformers 29L, a switch circuit 102L, a phase inverting circuit 101L, etc.

Since the fluorescent tube units 21a and 21c and 21b and 21d driven by the inverter circuit substrates 28R and 28L are alternately arranged, the luminance distribution may be balanced on the right and left sides of the screen in the longitudinal direction of the fluorescent tubes even with the reduced number of components of the transformers, and a worker may perform the assembly without being always conscious of the orientation, etc., of the fluorescent tube units.

Although the configurations of the inverter transformers has been suggested as above, the specific configurations are respectively made up of primary winding wires 291R and 291L and secondary winding wires 292R and 292L as shown in FIG. 9(B).

Although the number of the inverter transformers 29 connecting the fluorescent tube units in parallel should be minimized as far as possible in the example shown in FIG. 9(A), if the ratings (e.g., output power) of the inverter transformers are insufficient for necessary power considering the number, length, etc., of the serially connected fluorescent tubes, each of the inverter transformers 29 may be made up of two transformers and the necessary electric power may be supplied by connecting the primary winding wires as well as the secondary wires in parallel with each other as shown in FIG. 9(C) to supply electric power to the fluorescent tube units.

Although the exemplary configurations with the inverter circuit substrate 28 disposed on the external surface of the housing 23 (i.e., the surface opposite to the surface disposed with the fluorescent tubes 21) is shown in FIG. 8 exemplarily illustrating the example based on the present invention, one or both of the inverter circuit substrates 28L and 28R may be configured to be disposed on the internal surface of the housing 23. In this case, when the inverter circuit substrates 28 disposed on the internal surface of the housing are assembled to be housed by the lamp holders 5 exemplarily illustrated in FIG. 8 along with the end portions of the fluorescent tubes, an influence on the luminance nonuniformity generated in the vicinity of the disposed inverter circuit substrates may be constrained while thinning the overall display device. The same effect may be achieved in the example of providing the inverter circuit substrates 28 integrally with the lamp holders 5 for serially connecting the fluorescent tubes 21 in the above description.

The invention claimed is:

1. A backlight device comprising a plurality of fluorescent tubes in parallel arrangement with electrodes at both ends and an electrode receiving portion that receives the fluorescent tubes in parallel arrangement nearby the electrodes,
    the electrode receiving portion comprising a pair of electrode receiving portions,
    each electrode receiving portion including
    a power transfer member that holds the electrodes of the fluorescent tubes to transfer electric power to the fluorescent tubes, and
    a conducting member that holds an electrode of one fluorescent tube to achieve conduction between the electrode of the one fluorescent tube and an electrode of another fluorescent tube, wherein
    by attaching the pair of the electrode receiving portions to a housing with the electrodes at the both ends of the fluorescent tubes received respectively, the fluorescent tube held by the power transfer member included in one of the electrode receiving portions is held by the conducting member included in the other electrode receiving portion.

2. The backlight device as defined in claim 1, wherein each electrode receiving portion receives the power transfer member and the conducting member alternately in the arrangement direction of the fluorescent tubes.

3. The backlight device as defined in claim 1 or 2, wherein holding electrodes of two fluorescent tubes with the conductive member forms a square-U-shaped discharge path.

4. The backlight device as defined in claim 1 or 2, wherein the pair of the electrode receiving portions is attached to a housing to overlap a first region consisting of a square-U-shaped discharge path formed by holding electrodes of two fluorescent tubes with the conducting member included in one of the electrode receiving portion with a second region consisting of a square-U-shaped discharge path formed by holding the electrodes of two other fluorescent tubes with the conducting member included in the other electrode receiving portion.

5. The backlight device of as defined in claim 1 or 2, wherein the power transfer member includes a plurality of holding portions, and wherein fluorescent tubes held by the holding portion at electrodes are concurrently supplied with electric power signals.

6. The backlight device as defined in claim 5, wherein two fluorescent tubes connected by the power transfer member are supplied with the power signals having the same frequency and phases approximately inverted to each other.

7. The backlight device as defined in claim 1 or 2, wherein each fluorescent tube is made up of an external electrode fluorescent tube.

8. The backlight device as defined in claim 1 or 2, wherein each fluorescent tube includes wire electrodes of a predetermined length at both ends, and wherein the electrode receiving portion includes a holding member that pinches and holds a wire electrode of each fluorescent tube.

9. A liquid crystal display device comprising the backlight device as defined in claim 1 or 2 and a liquid crystal panel illuminated by the backlight device.

* * * * *